United States Patent
Kim

[11] Patent Number: 6,094,407
[45] Date of Patent: Jul. 25, 2000

[54] DEVICE AND METHOD FOR REDUCING JITTER IN OPTICAL DISC

[75] Inventor: Seon Gyoung Kim, Kyungki-do, Rep. of Korea

[73] Assignee: LG Electronics Inc., Seoul, Rep. of Korea

[21] Appl. No.: 09/090,237

[22] Filed: Jun. 4, 1998

[30] Foreign Application Priority Data

Jul. 22, 1997 [KR] Rep. of Korea ............ 97-34322

[51] Int. Cl.[7] .................................................. G11B 5/76
[52] U.S. Cl. .................................... 369/59; 369/124
[58] Field of Search ............................ 369/47, 48, 49, 369/54, 58, 60, 124, 59; 360/24, 29, 30, 31, 32, 48, 51

[56] References Cited

U.S. PATENT DOCUMENTS

| | | | |
|---|---|---|---|
| 5,535,187 | 7/1996 | Melas et al. | 369/59 |
| 5,802,032 | 9/1998 | Jacobs et al. | 369/59 |
| 5,848,045 | 12/1998 | Kirino et al. | 369/54 X |

*Primary Examiner*—Paul W. Huber
*Attorney, Agent, or Firm*—Fleshner & Kim, LLP

[57] ABSTRACT

Device for reducing a jitter in an optical disc, is disclosed, including a DVD formatter for providing a DVD format signal according to a DVD source signal, a pulse width adjuster for separating the DVD format signal from the DVD formatter into signals of frequencies each being a certain times of a basic clock, comparing the signals to a reference voltage, and adjusting a pulse width of each of the signals according to results of the comparisons, a DVD signal extractor for adding the signals each having the pulse width adjusted in the pulse width adjuster in extracting a pulse width adjusted DVD signal, and amplifying the pulse width adjusted DVD signal, and a laser beam recorder for directing a laser beam onto a DVD according to the DVD signal extracted and amplified in the DVD signal extractor to form pits corresponding to the frequency of the certain times in the DVD, and a method for reducing a jitter in an optical disc, whereby facilitating individual adjustments of pulse widths of DVD format signals from the DVD formatter according to a reference voltage from the comparator, allowing elimination of asymmetry that reduces a jitter occurred in molding an optical disc.

8 Claims, 6 Drawing Sheets

DEVICE AND METHOD FOR REDUCING JITTER IN OPTICAL DISC

BACKGROUND OF THE INVENTION

1. Field of the Invention

The present invention relates to an optical disc, and more particularly, to device and method for reducing a jitter in an optical disc.

2. Discussion of the Related Art

In production of the optical disc, there are an injection molding process in which resin is injected into a mold to form an optical disc and a mastering process in which the mold for the injection molding is provided. In the mastering, a cutting process is included. And, in the cutting process, a process for directing a laser beam onto a glass coated with photoresist PR to etch the glass is included.

A background art optical disc device will be explained with reference to the attached drawings. FIG. 1 illustrates the background art optical disc device, schematically.

Referring to FIG. 1, the background art optical disc device is provided with a DVD formatter 1 for providing a DVD format signal in response to a DVD source signal for a digital versatile disc(called "DVD" hereafter), and a laser beam recorder(called "LBR" hereafter) for directing a laser beam modulated according to the DVD format signal from the DVD formatter 1 onto the DVD through different optical system to form pits in the DVD. The LBR 2 has an acoustic optic modulator(called "AOM" hereafter) 2a for switching the laser beam in response to the DVD format signal from the DVD formatter 1.

FIG. 2 illustrates a timing diagram in the DVD formatter shown in FIG. 1, FIG. 3 illustrates a difference of an ideal timing and an actual timing in the DVD formatter, FIG. 4 illustrates an ideal eye-pattern of FIG. 1, and FIG. 5 illustrates an asymmetry eye-pattern of FIG. 1. The background art optical disc device will be explained with reference to the attached drawings.

First, the DVD formatter 1 provides a DVD format signal in response to a received DVD source signal. That is, as shown in FIG. 2, the DVD formatter 1 provides a signal of 3T~14T at random in response to a DVD source signal. The 3T signal denotes a signal having a three time of frequency of a signal having a basic frequency T, 4T signal four times, and so on. Then, the LBR 2 modulates a laser beam according to the DVD format signal and directs the laser beam onto a DVD through different optical system to form pits therein. That is, the AOM 2a in the LBR 2 turns on/off the laser beam in response to the DVD format signal from the DVD formatter 1. As shown in FIG. 2, the laser beam turned on/off by the AOM 2a is directed onto the DVD through different optical systems, to form pits each corresponding to a number of times of the basic frequency. Though each of the pits is intended to have a length corresponding to a length of the DVD format signal from the DVD formatter 1, an actual length of the pit may have an error depending on characteristics of the LBR 2. This error affect much to a 3T signal with a short signal length and little to a 14T signal with a long signal length. That is, if signals from the pits in the optical disc is examined on an oscilloscope before any signal processing, centers of the signals fall on an axis as an ideal eye-pattern shown in FIG. 4. However, if the lengths of the pits are slightly longer, centers of the 3T signals deviate to a low side of the axis as an asymmetry eye-pattern shown in FIG. 5, which is called asymmetry in a signal analysis. That is, as shown in FIG. 3, when $T_w$ is assumed to be a frequency of a basic clock of the DVD signal, a frequency of an ideal 3T signal is $3T_w$. However, an asymmetry of $3T_w + \Delta T_w$ may occur of the real 3T signal in a read. In this instance, a jitter and a standard deviation may be expressed as the following equations (1) and (2).

$$jitter(\%) = \frac{\delta_W}{T_W} * 100 \quad (1)$$

$$\sigma_W = \frac{\sqrt{\Sigma(3T_W - (3T_W + \Delta T_W))^2}}{N} \quad (2)$$

The jitter value is a percentage standard deviation of an actual 3T signal from an ideal 3T signal in terms of time period.

As there is no device for correcting the asymmetry occurred in the process of forming the pits in the background art, mastering conditions have been varied for correcting the asymmetry. However, the correction of an asymmetry by varying the mastering conditions has not been successful since there are too many variables in correction of asymmetry, such as an intensity of the laser beam, a thickness of the photoresist, a developing time period, a developing level, and the like, failing to match a pit length of a certain times.

SUMMARY OF THE INVENTION

Accordingly, the present invention is directed to device and method for reducing a jitter in an optical disc that substantially obviates one or more of the problems due to limitations and disadvantages of the related art.

An object of the present invention is to provide device and method for reducing a jitter in an optical disc which can reduce a jitter occurred in molding the optical disc by eliminating an asymmetry.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for reducing a jitter in an optical disc includes a DVD formatter for providing a DVD format signal according to a DVD source signal, a pulse width adjuster for separating the DVD format signal from the DVD formatter into signals of frequencies each being a certain times of a basic clock, comparing the signals to a reference voltage, and adjusting a pulse width of each of the signals according to results of the comparisons, a DVD signal extractor for adding the signals each having the pulse width adjusted in the pulse width adjuster in extracting a pulse width adjusted DVD signal, and amplifying the pulse width adjusted DVD signal, and a laser beam recorder for directing a laser beam onto a DVD according to the DVD signal extracted and amplified in the DVD signal extractor to form pits corresponding to the frequency of the certain times in the DVD, and a method for reducing a jitter in an optical disc.

In other aspect of the present invention, there is provided a method for reducing a jitter in an optical disc, including the steps of (1) separating a DVD signal into signals of frequencies each being a certain times of a basic clock, (2)

respectively comparing the signals of frequencies each being a certain times separated in the step (1) to a reference voltage and adjusting pulse widths of the signals according to results of the comparisons, (3) adding the signals of certain times having pulse widths adjusted in the step (2) in extracting a pulse width adjusted DVD signal and amplifying the pulse width adjusted DVD signal, and (4) directing a laser beam, modulated according to the DVD signal amplified in the step (3), onto a DVD to form pits corresponding to the frequencies of certain times in the DVD.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 6:
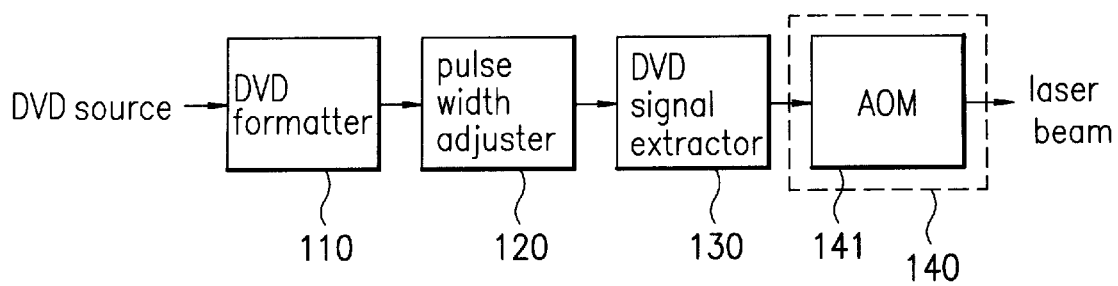
FIG. 6 schematically illustrates a device for reducing a jitter in an optical disc in accordance with a preferred embodiment of the present invention.

Reference will now be made in detail to the preferred embodiments of the present invention, examples of which are illustrated in the accompanying drawings. FIG. 6 schematically illustrates a device for reducing a jitter in an optical disc in accordance with a preferred embodiment of the present invention, FIG. 7 illustrates a detail of the pulse width correcting part shown in FIG. 6, FIG. 8 illustrates a detail of the DVD signal extracting part shown in FIG. 6, and FIG. 9 illustrates a detail of the DVD signal separating part shown in FIG. 7.

Figure 1:
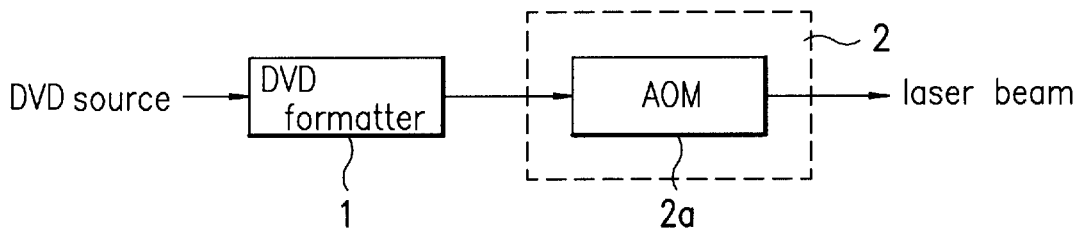
FIG. 1 illustrates a background art optical disc device, schematically.
Figure 2:
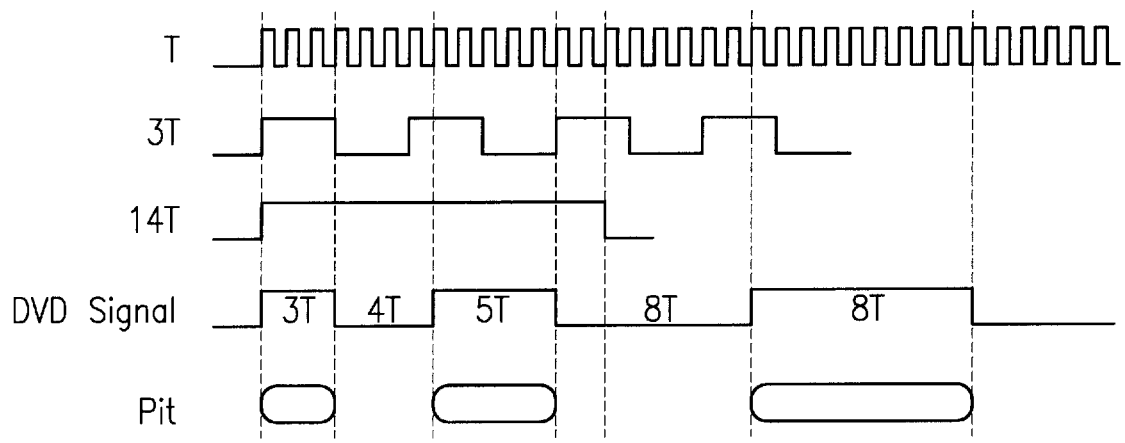
FIG. 2 illustrates a timing diagram in the DVD formatter shown in FIG. 1.
Figure 3:
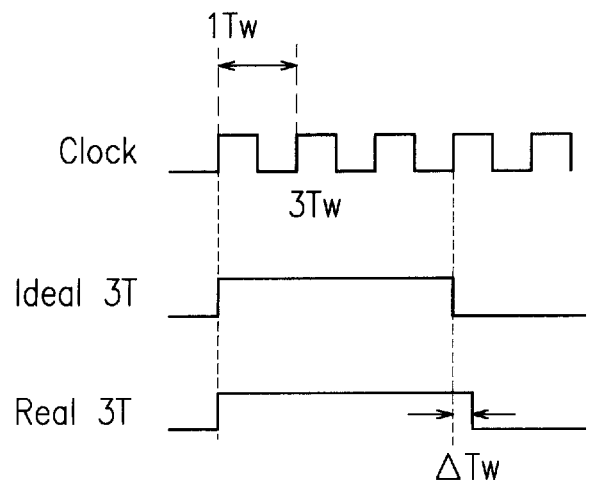
FIG. 3 illustrates a difference of an ideal timing and an actual timing in the DVD formatter.
Figure 4:
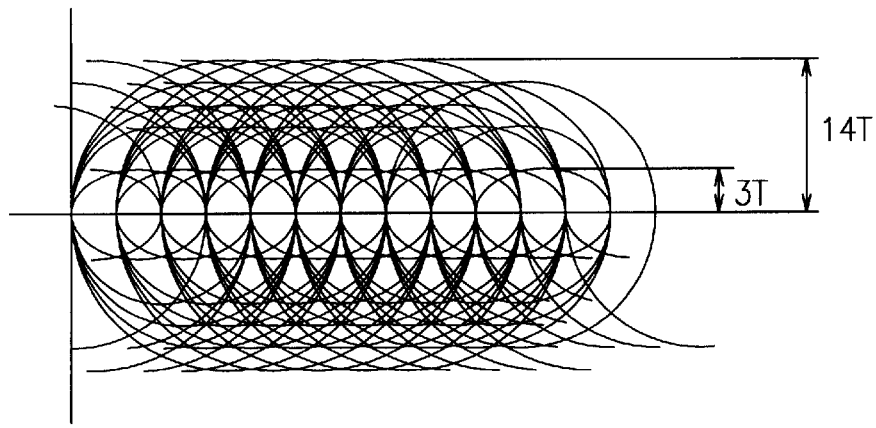
FIG. 4 illustrates an ideal eye-pattern of FIG. 1.
Figure 5:
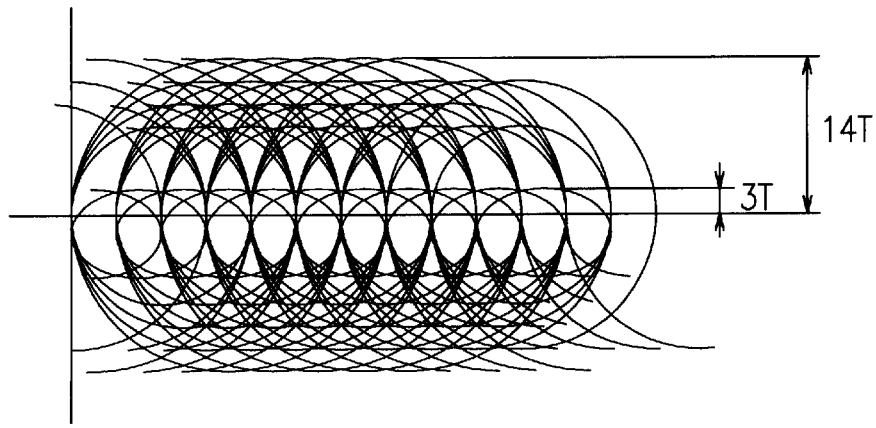
FIG. 5 illustrates an asymmetry eye-pattern of FIG. 1.

Referring to FIG. 6, the device for reducing a jitter in an optical disc in accordance with a preferred embodiment of the present invention includes a DVD formatter 110 for providing a DVD format signal according to a DVD source signal, a pulse width adjuster 120 for separating the DVD format signal from the DVD formatter 110 into signals of frequencies each being a certain times of a basic clock, comparing the signals to a reference voltage, and adjusting a pulse width of each of the signals according to results of the comparisons, a DVD signal extractor 130 for adding the signals each having the pulse width adjusted in the pulse width adjuster 120 in extracting a pulse width adjusted DVD signal, and amplifying the pulse width adjusted DVD signal, and an LBR 140 for directing a laser beam to a DVD according to the DVD signal extracted and amplified in the DVD signal extractor 130 to form pits corresponding to the frequency of the certain times in the DVD. As shown in FIG. 7, the pulse width adjuster 120 includes a DVD signal separator 121 for separating the DVD format signal from the DVD formatter 110 into signals of frequencies each being a certain times of the basic clock, a variable resistor 122 for varying the reference voltage for adjusting a pulse width of each signal of a frequency being a certain times separated in the DVD signal separator 121, and a comparator 123 for comparing the signal of a frequency being a certain times separated in the DVD signal separator 121 and the reference voltage varied in the variable resistor 122 and adjusting a pulse width according to a result of the comparison. As shown in FIG. 8, the DVD signal extractor 130 includes an adder 131 for adding the signals having pulse widths adjusted in the comparator 123 in the pulse width adjuster 120 in extracting a DVD signal, and an amplifier 132 for amplifying the DVD signal extracted in the adder 131. As shown in FIG. 9, the DVD signal separator 121 includes a counter 121a for counting the DVD signal from the DVD formatter 110 according to the basic clock, a multiplexer 122b for separating, multiplexing and forwarding the signal of a certain times in response to a signal from the counter 121a. The comparator 123 and the adder 131 include a plurality of comparators 123a~123n and adders 131a~131n, respectively. The amplifier 132 includes a first, and second amplifiers 132a and 132b. As explained in association with FIG. 1, the LBR 140 includes an AOM 141 of which explanation is omitted.

Figure 7:
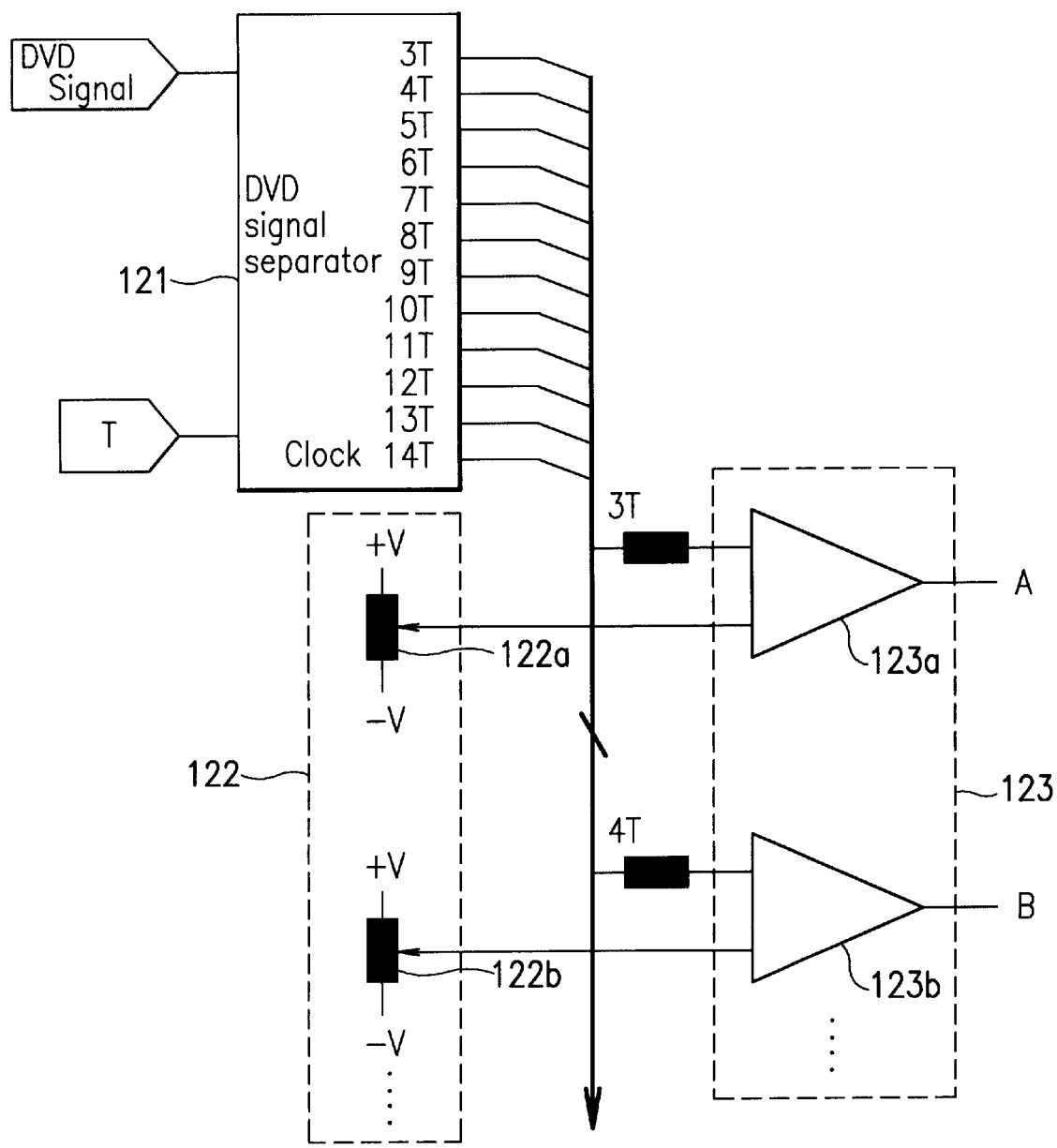
FIG. 7 illustrates a detail of the pulse width correcting part shown in FIG. 6.
Figure 8:
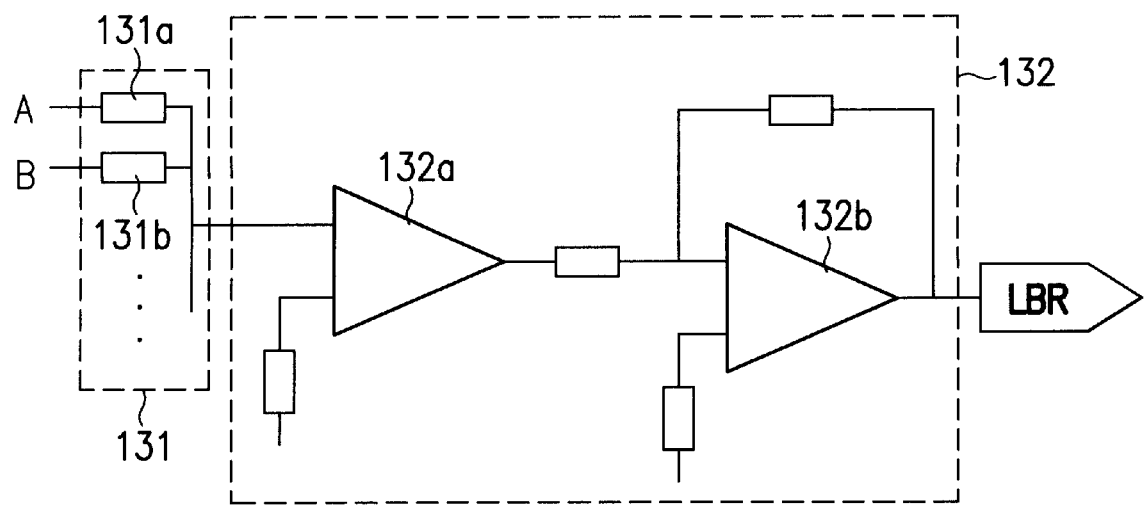
FIG. 8 illustrates a detail of the DVD signal extracting part shown in FIG. 6.
Figure 9:
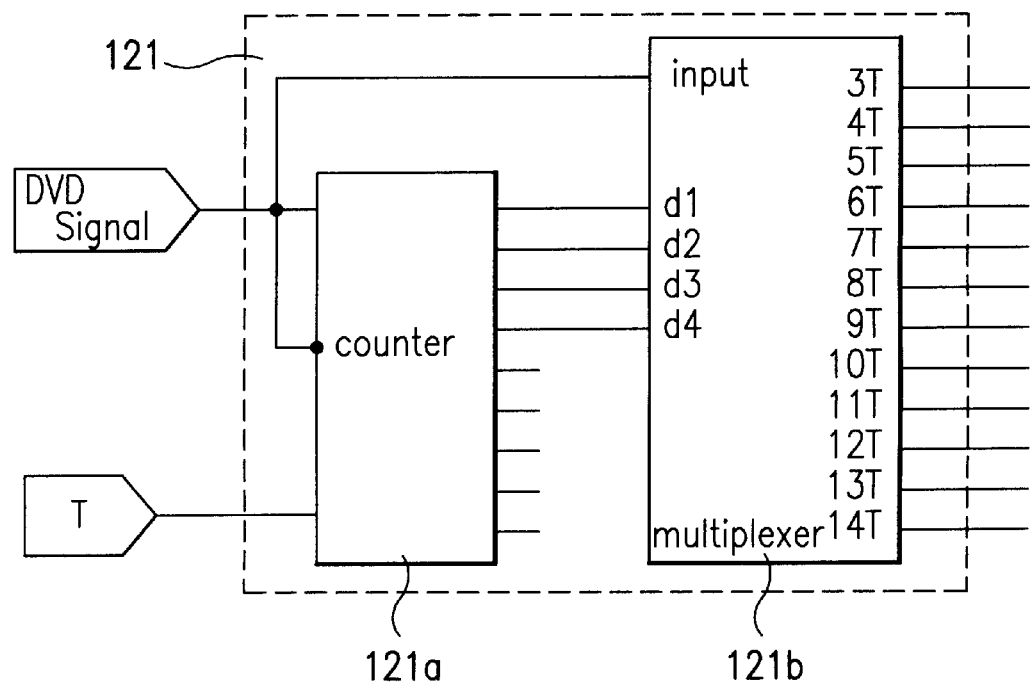
FIG. 9 illustrates a detail of the DVD signal separating part shown in FIG. 7; and, FIG. 10 illustrates an enlarged view of a DVD disc format signal from the DVD formatter shown in FIG. 7.
Figure 10:
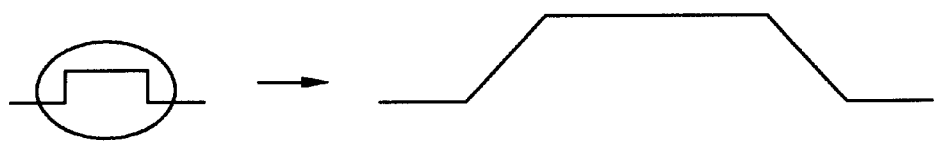
Figure 11:
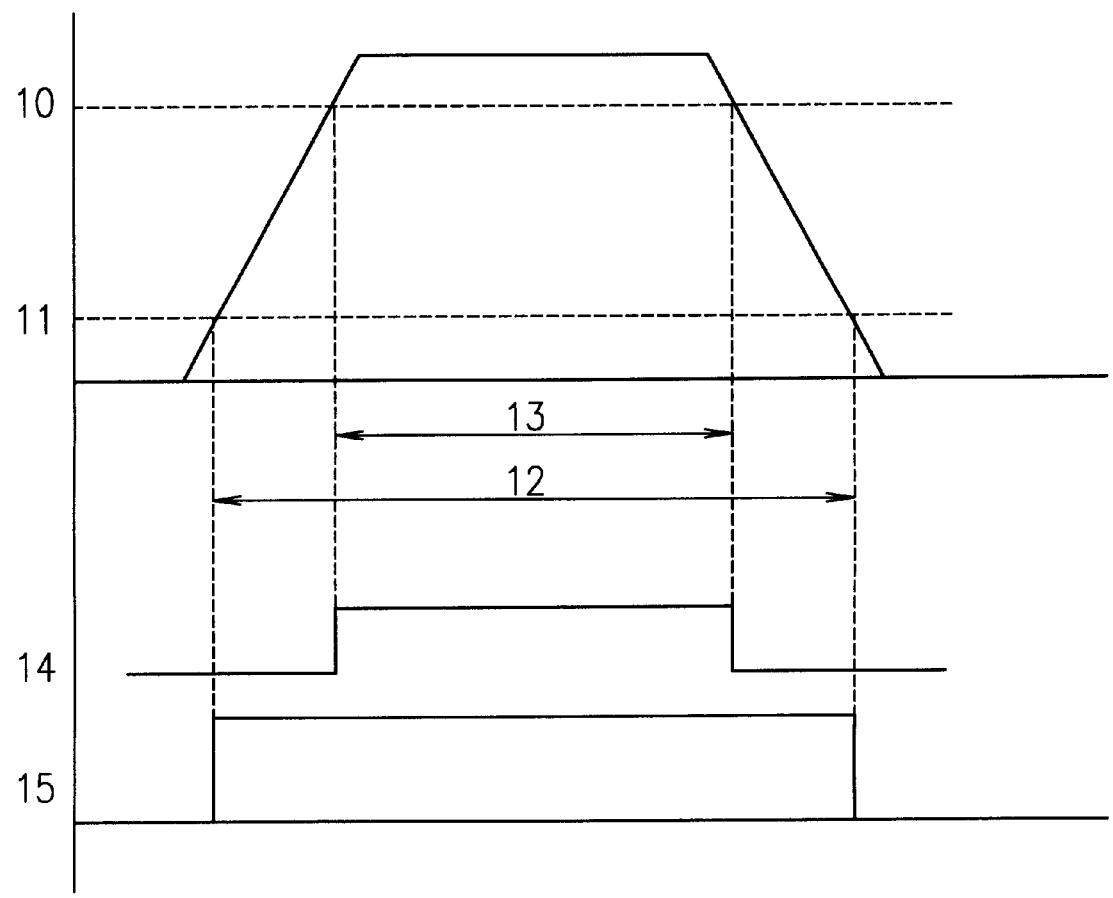
FIG. 11 illustrates a timing diagram of an output of the comparator in adjusting the variable resistor part shown in FIG. 7; and, FIG. 12 illustrates a timing diagram for outputs of different parts shown in FIGS. 7 and 8.
Figure 12:
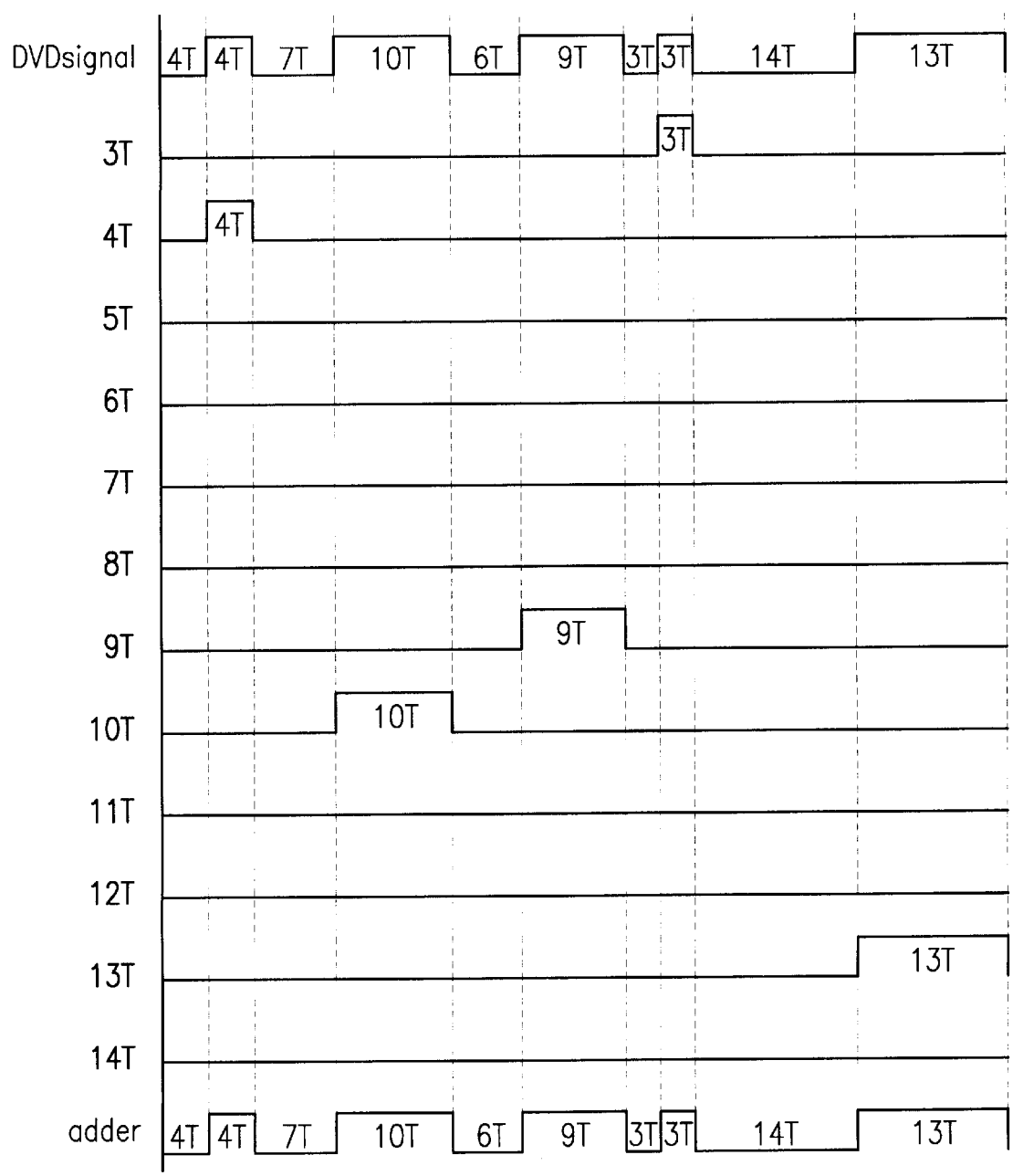

FIG. 10 illustrates an enlarged view of a DVD disc format signal from the DVD formatter shown in FIG. 7, FIG. 11 illustrates a timing diagram of an output of the comparator in adjusting the variable resistor part shown in FIG. 7, and FIG. 12 illustrates a timing diagram for outputs of different parts shown in FIGS. 7 and 8. The operation of the device and method for reducing a jitter in an optical disc of the present invention will be explained with reference to the attached drawings.

First, in order to record a data on an optical disc, the DVD formatter 110 receives a DVD source signal and provides a DVD format signal according to the DVD source signal. Shown in FIG. 10 is an enlarged view of the DVD format signal provided from the DVD formatter 110. Then, the pulse width adjuster 120 adjusts the pulse width of the DVD format signal provided from the DVD formatter 110, i.e., as shown in FIG. 12, the DVD signal separator 121 in the pulse width adjuster 120 separates the DVD format signal from the DVD formatter 110 into signals of frequencies each being a certain times of the basic clock. The counter 121 a in the DVD signal separator 121 counts the DVD signal from the DVD formatter 110 according to the basic clock. That is, the counter 121a counts the DVD signal from the DVD formatter 110 according to the basic clock and forwards the signal in a binary signal corresponding to the signal of a frequency being a certain times of the basic clock. Then, the multiplexer 121b multiplexes the DVD format signal into a signal of certain times according to the binary signal from the counter 121a. For example, if a 5T is received as the DVD format signal, the counter 121a counts this signal and provides "0101" corresponding to a binary of the numeral 5. Then, the multiplexer 121b multiplexes the DVD format signal with the 5T according to the "0101" from the counter 121a. In the meantime, the variable resistor 122 in the pulse width adjuster 120 provides a reference voltage for adjusting the pulse width of signals of frequencies each being a certain times separated in the DVD signal separator 121. In this instance, the reference voltage may vary in a range of –Vcc~+Vcc. According to this, the comparator 123 respectively compares the signals of frequencies each being a certain times separated in the DVD signal separator 121 to the reference signal varied in the variable resistor 122. That is, the comparator 123 provides high signals if the signals of frequencies each being a certain times separated in the DVD signal separator 121 are higher than the reference voltage from the variable resistor 122, and low signals if lower, respectively. For instance, the comparator 123 has the 3T, 4T, ... signals separated in the DVD signal separator 121 compared to the reference voltage from the variable resistor 122 respectively in the plurality of comparators 123a~123n to provide high signals if higher than the reference voltage and low signals if lower than the reference signal, respectively. Referring to FIG. 11, the comparator 123 also adjusts a pulse width of each of the signals of frequencies each being a certain times separated in the DVD signal separator 121 into 13 if the reference voltage from the variable resistor 122 is 10, and into 12 if the reference voltage from the variable resistor 122 is 11 (A, B, ... n). Then, the DVD signal extractor 130 adds the signals of certain times pulse width adjusted in and provided from the comparator 123 in the pulse width adjuster 120 in extracting a pulse width adjusted DVD signal as shown in FIG. 12 and amplifies the extracted DVD signal. The adder 131 in the DVD signal extractor 130 adds the signals pulse width adjusted in and forwarded from the comparator 123 in the pulse width adjuster 120 in extracting a pulse width adjusted DVD signal. For example, the plurality of adders 131a~131n in the adder 131 adds the signals A, B, ... n pulse width adjusted in and provided from the comparator 123 in the pulse width adjuster 120 in extracting a pulse width adjusted DVD signal. The amplifier 132 amplifies a level of the pulse width adjusted DVD signal from the adder 131 to be in conformity with the LBR 140. That is, the first and second amplifiers 132a and 132b amplify the pulse width adjusted signals from the adder 131 in multiple stages to be in conformity with the LBR 140. Then, the LBR 140 directs a laser beam, modulated according to the DVD signal amplified in the DVD signal extractor 130, onto the DVD to form pits corresponding to the frequency of a certain times in the DVD. That is, the AOM 141 in the LBR 140 turns on the laser beam if the DVD signal amplified in the amplifier 132 in the DVD signal extractor 130 is at high, and turns off if low. The laser beam turned on/off in the AOM 2a is directed onto the DVD through different optical systems, to form pits corresponding to a certain times of the basic frequency T of the DVD signal as shown in FIG. 12.

The device and method for reducing a jitter in an optical disc of the present invention facilitates individual adjustments of pulse widths of DVD format signals from the DVD formatter according to a reference voltage from the comparator allowing elimination of asymmetry that reduces a jitter occurred in molding an optical disc.

It will be apparent to those skilled in the art that various modifications and variations can be made in the device and method for reducing a jitter in an optical disc of the present invention without departing from the spirit or scope of the invention. Thus, it is intended that the present invention cover the modifications and variations of this invention provided they come within the scope of the appended claims and their equivalents.

What is claimed is:

1. A device for reducing a jitter in an optical disc comprising:

a DVD formatting means for providing a DVD format signal according to a DVD source signal;

a pulse width adjusting means for separating the DVD format signal from the DVD formatting means into signals of frequencies each being a certain times of a basic clock, comparing the signals to a reference voltage, and adjusting a pulse width of each of the signals according to results of the comparisons;

a DVD signal extracting means for adding the signals each having the pulse width adjusted in the pulse width adjusting means in extracting a pulse width adjusted DVD signal, and amplifying the pulse width adjusted DVD signal; and, a laser beam recording means for directing a laser beam onto a DVD according to the DVD signal extracted and amplified in the DVD signal extracting means to form pits corresponding to the frequency of the certain times in the DVD.

2. A device for reducing a jitter in an optical disc as claimed in claim 1, wherein the pulse width adjusting means includes, a DVD signal separator for separating the DVD format signal from the DVD formatting means into signals of frequencies each being a certain times of the basic clock, a variable resistor for varying the reference voltage for adjusting a pulse width of each signal of a frequency being a certain times separated in the DVD signal separator, and a comparator for comparing the signal of a frequency being a certain times separated in the DVD signal separator and the reference voltage varied in the variable resistor and adjusting a pulse width according to a result of the comparison.

3. A device for reducing a jitter in an optical disc as claimed in claim 2, wherein the DVD signal separator includes, a counter for counting the DVD signal from the DVD formatting means according to a basic clock, and a multiplexer for multiplexing the signal of a certain times according to a signal from the counter.

4. A device for reducing a jitter in an optical disc as claimed in claim 2, wherein the comparator includes a plurality of comparators.

5. A device for reducing a jitter in an optical disc as claimed in claim 1, wherein the DVD signal extracting means includes, an adder for adding the signals having pulse widths adjusted in the comparator in the pulse width adjusting means in extracting a DVD signal, and an amplifier for amplifying the DVD signal extracted in the adder.

6. A device for reducing a jitter in an optical disc as claimed in claim 5, wherein the adder includes a plurality of adders.

7. A device for reducing a jitter in an optical disc as claimed in claim 5, wherein the amplifier includes a plurality of amplifiers.

8. A method for reducing a jitter in an optical disc, comprising the steps of:

(1) separating a DVD signal into signals of frequencies each being a certain times of a basic clock;

(2) respectively comparing the signals of frequencies each being a certain times separated in the step (1) to a reference voltage and adjusting pulse widths of the signals according to results of the comparisons;

(3) adding the signals of certain times having pulse widths adjusted in the step (2) in extracting a pulse width adjusted DVD signal and amplifying the pulse width adjusted DVD signal; and, (4) directing a laser beam, modulated according to the DVD signal amplified in the step (3), onto a DVD to form pits corresponding to the frequencies of certain times in the DVD.

* * * * *